United States Patent Office 3,827,928
Patented Aug. 6, 1974

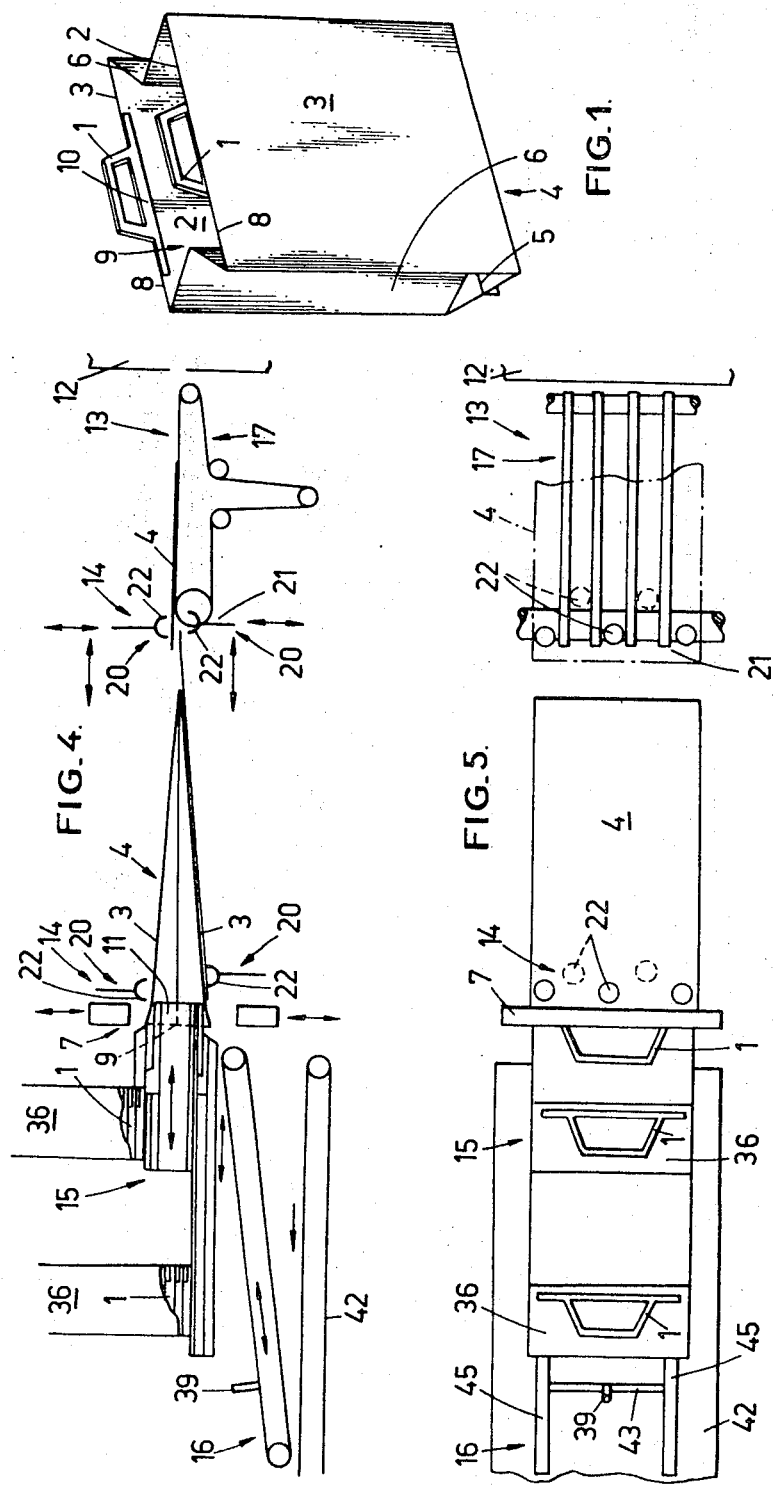

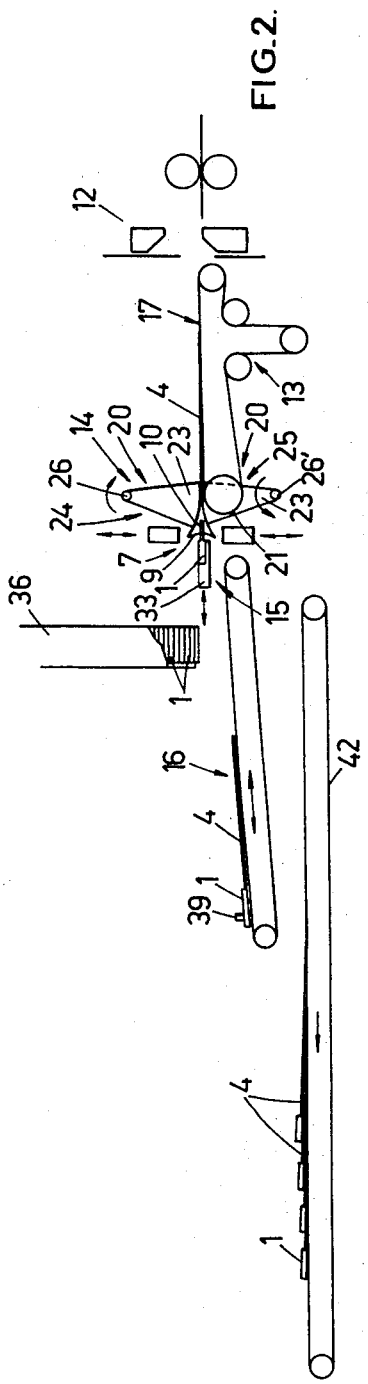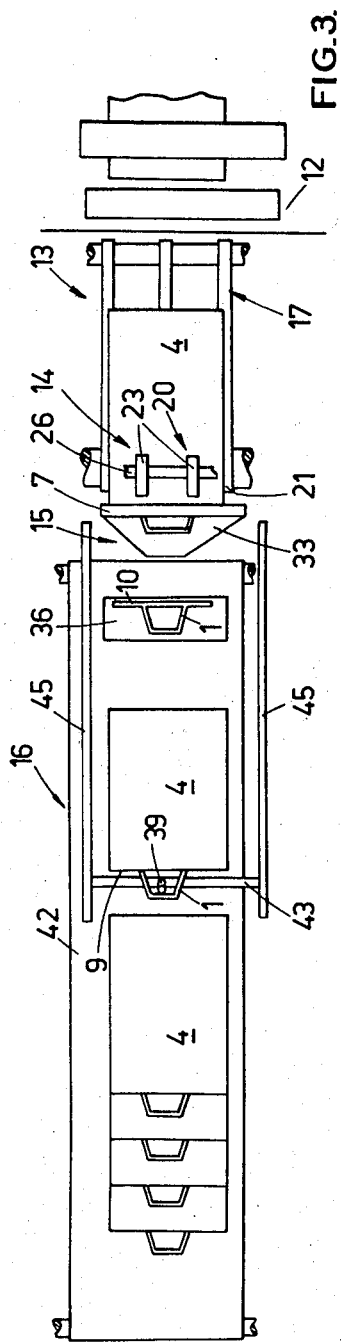

3,827,928
METHOD FOR MANUFACTURING SHOPPING
BAGS AND DEVICE FOR THE WORKING
THEREOF
Edouard Louis van de Gent, Meise, Belgium, assignor to
Printex, Neder-over-Heembeek, Belgium
Filed Oct. 19, 1971, Ser. No. 190,562
Claims priority, application Belgium, Oct. 20, 1970,
95,332
Int. Cl. B31b 19/74; B32b 31/20
U.S. Cl. 156—423
9 Claims

ABSTRACT OF THE DISCLOSURE

Method for manufacturing shopping bags from sealable plastic material with two handles, in particular bags provided with side bellows, which comprises spreading apart the walls of the bag, introducing inside the bag the handle portions to be welded onto the said walls along a direction opposite to the bag movement direction, bringing the walls of the bag into contacting relationship with the handles, simultaneously welding the handles and releasing the bag provided with its handles in the bag movement direction, the device for working such method which comprises feeding means for the bags with a stepwise movement so as to bring one by one the bag opening directed along the feeding direction, under sealing jaws for on the one hand, spreading the bag walls from one another adjacent the opening thereof and on the other hand, releasing said walls, and means for simultaneously introducing inside the bag, those parts of both handles which are to be joined to the inner sides of the bag walls.

---

This invention has for object a method for manufacturing shopping bags from sealable plastic material with two handles which are attached adjacent the bag opening and facing one another, to the inner sides of the larger walls of the bag.

Shopping bags are already manufactured with handles which are automatically fitted. However the known methods have various drawbacks resulting from the handles being fitted simultaneously with the bag-forming operations. Indeed according to such methods, it is impossible to obtain even when it is most desirable, a bag with two side bellows and a bottom seam and in which the handles are attached to the inner sides of the bag walls.

The invention has for object to obviate said drawbacks and to provide a simple method by means of which it is possible to fit automatically handles in a bag after forming said bag, such as a bag with side bellows, bottom seam and inner handles.

For this purpose according to the invention, the formed bags are brought one by one to the location where the handles are sealed in such a way that the sealing may be performed along the bag opening edges, the bag walls are spread from one another and inside the bag are introduced the handles to be sealed to the bag walls, the bag walls are engaged with the handles, sealing of parts of said handles to the bag being simultaneously performed and the bag provided with the handles is discharged along the bag movement direction.

According to the invention, the handles are introduced inside the bag along a direction opposite to the bag movement direction.

According to the invention, the formed bags are conveyed stepwise and one by one in such a way that the opening thereof which is directed along the bag movement direction, is stopped in said location where the sealing is performed, the bag walls being spread from one another before stopping of the bag and both handles are fed to the bag to be located between the bag walls before stopping of the bag in the sealing location.

The invention also pertains to a device for the working of the above-described method.

According to the invention said device comprises feeding means for the bags with a stepwise movement so as to bring one by one the bag opening directed along the feeding direction, under sealing jaws for on the one hand, spreading the bag walls from one another adjacent the opening thereof and on othe other hand, releasing said walls, and means for simultaneously introducing inside the bag, those parts of both handles which are to be joined to the inner sides of the bag walls.

In an advantageous embodiment of the invention, said device comprises means for removing the bag provided with the handles thereof from that location where said handles are sealed to the bag.

In a particularly advantageous embodiment of the invention, the means for introducing the handles inside the bag are arranged downstream from the sealing jaws, the handles being introduced inside the bag along a direction opposite to the bag movement direction.

Other details and features of the invention will stand out from the description given below by way of non-limitative example and with reference to the accompanying drawings, in which:

FIG. 1 is a diagrammatic perspective view of a shopping bag obtained according to the teachings of the invention.

FIG. 2 is a diagrammatic elevation view of the device according to the invention.

FIG. 3 is a plan view corresponding to the FIG. 2.

FIGS. 4 and 5 are diagrammatic views corresponding to FIGS. 2 and 3, which show another embodiment of the device shown in said FIGS. 2 and 3.

Figure 6:
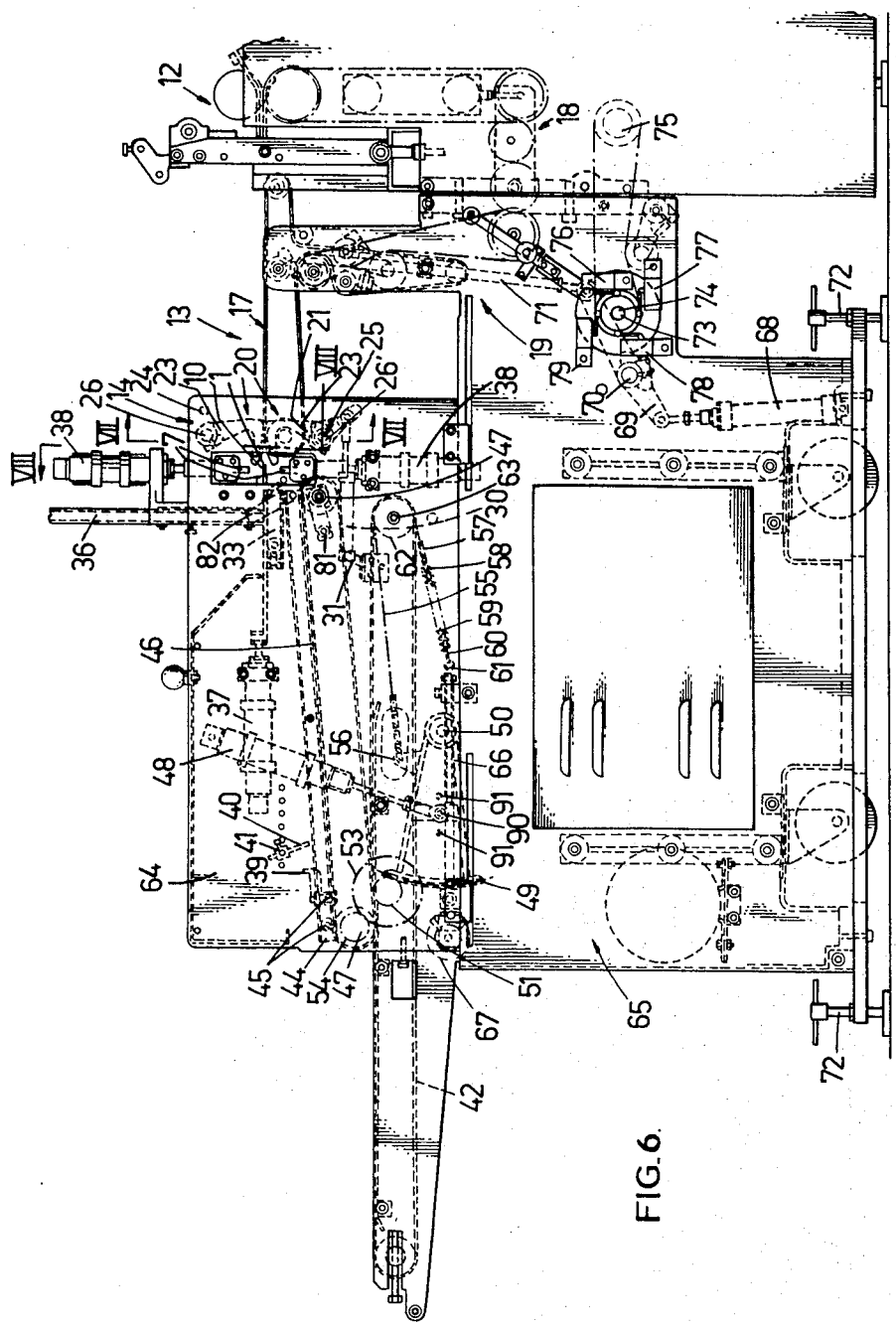

FIG. 6 is an elevation view which shows in detail the device as shown in FIGS. 2 and 3, said device being arranged at the outlet from a bag-forming machine.

Figure 7:
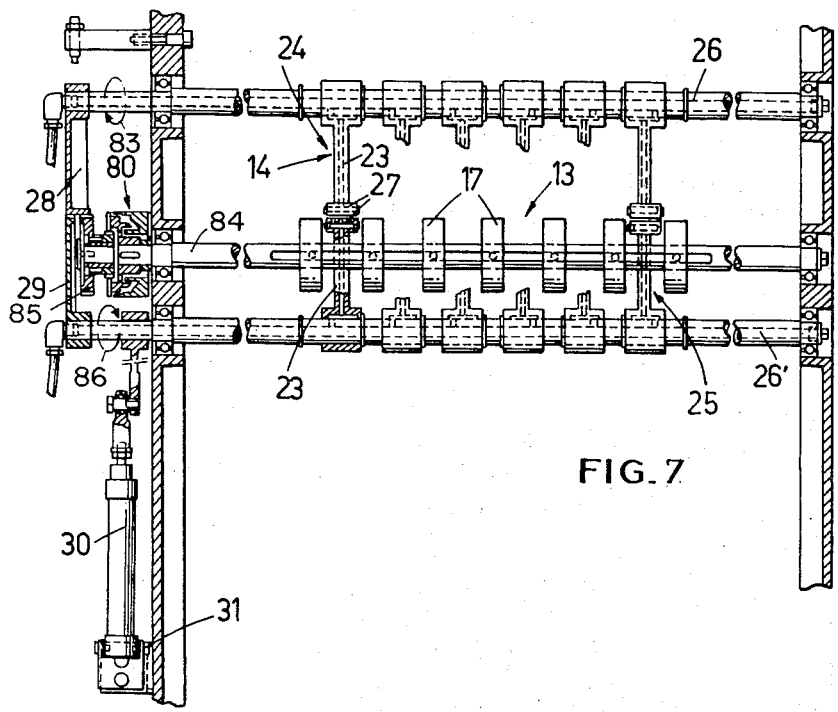

FIG. 7 is a part view along line VII—VII in FIG. 6, which shows on a larger scale, the means for spreading the bag walls from one another so as to introduce both handles inside said bag.

Figure 8:
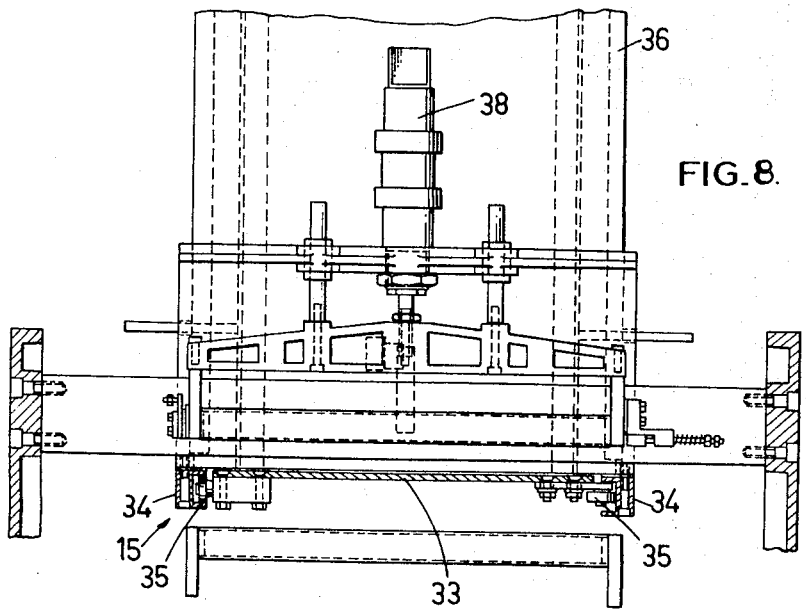

FIG. 8 is a part view along line VIII—VIII in FIG. 6, which shows on a larger scale, the means for arranging the handles between the bag walls as well as the sealing jaws.

Figure 9:
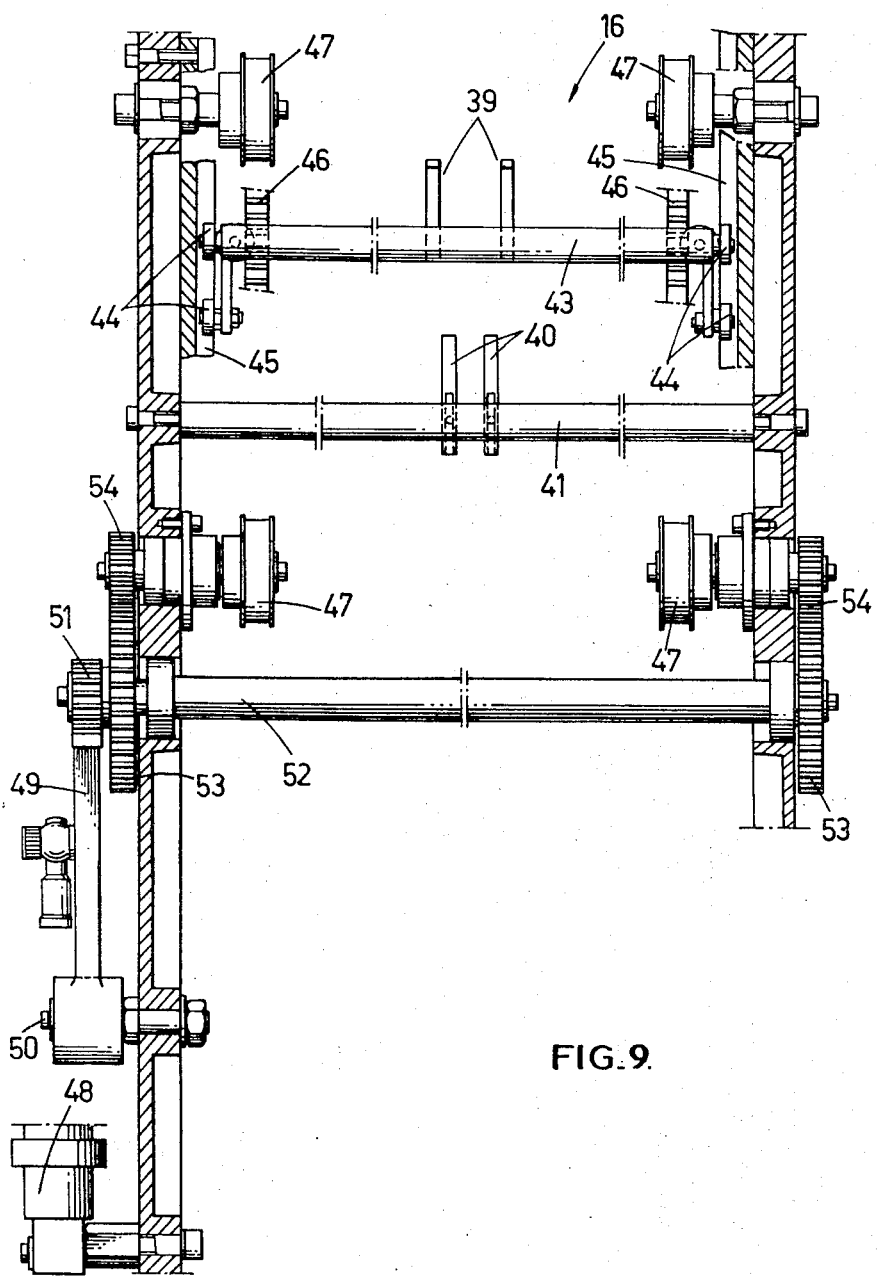

FIG. 9 is a plan view with parts broken away and on a larger scale than FIG. 6, which shows the means for removing the bags provided with the handles thereof from the location where said handles are sealed to the bags.

In the various figures, the same reference numerals pertain to similar elements.

The method according to the invention for automatically fitting handles 1 to the inner sides 2 of the walls 3 of a bag 4 with bottom seam 5 and possibly with side bellows 6, comprises bringing as shown in FIGS. 2 to 5, the formed bags to a station 7 where the sealing or welding of the handles 1 is so performed as to allow the sealing to be made along the edges 8 of the bag opening, spreading the walls 3 from one another adjacent the bag opening 9 and introducing inside the bag those parts 10 of the handles 1 which are to be sealed to the bag walls, releasing the bag walls to let same engage the handles and simultaneously performing the sealing of the handle parts 10 to the bag and then removing said bag provided with the handles thereof along the bag movement direction, the handles being introduced inside said bags along a direction opposite to the bag feeding. The bags are conveyed one by one and stepwise in such a way that the opening 9 thereof is directed along the bag movement direction. Such conveying is so designed that the bag opening stops in the station 7 where the sealing or welding is performed, the bag walls being spread from one another before the bag stops and the handles 1 being fed to the bag to be arranged between the walls 3 before stopping of the bag. Both said handles 1 are introduced in the bags either as handle pairs removably joined together or as pairs of unassembled handles (as shown in FIGS. 2 and 3), or else simultaneously and spaced from one another (as shown in FIGS. 4 and 5), said handles being in this last case located in parallel planes and being sealed simultaneously to the bag, an insert part 11 then being located between the handles 1. The formed bags may be brought either one by one and stepwise to the station 7 where the sealing of the handles is performed, from a stacked bag source, or as shown in the drawings, from a machine 12 where the bags are formed, in which latter case, the conveying of the bags to the station 7, the sealing operations for the handles 1 and the removing of the bags provided with the handles are synchronized with the bag forming operations.

It would also be possible according to the invention, to convey the bags one by one and stepwise to the station 7 where the handles 1 are sealed to the bag in such a way that the opening 9 thereof stops in said station, the bag walls 3 being spread from one another and the handles being introduced between said walls 3 when the bag has stopped, the sealing being performed when the released walls 3 engage the handles introduced inside the bag.

The device according to the invention for the working of the above method may be used alone for automatically fitting handles 1 to shopping bags which have been formed previously and notably in bags with bottom seam and with or without side bellows. In such a case, said device is supplied from a stacked formed bag source. Said device may also advantageously be arranged at the outlet of a bag-forming machine, the bag feeding through the device then being synchronized with the feeding of the bags through the forming machine, in such a way that the handles are attached at the same rate the bags are formed. Said device comprises as shown in the drawings, feeding means 13 for the bags driven stepwise to bring one by one the bag openings 9, directed along the feeding direction, under sealing or welding jaws 7, means 14 located upstream from the jaws 7 to on the one hand, spread the bag walls 3 from one another adjacent the opening 9 thereof and on the other hand, release said walls to allow sealing of the handles, means 15 for introducing simultaneously those parts 10 of both handles 1 which are to be joined to the inner sides 2 of the bag walls and retain said handles 1 during the sealing thereof to the bag, as well as means 16 for removing the bag provided with the handles thereof from the sealing jaws 7 and discharge said bag from the device, the means 15 being located downstream from the sealing jaws in such a way that the handles 1 are introduced inside the bag along a direction opposite to the bag feeding movement through the device.

The feeding means 13 for the bags are comprised of an endless band 17 formed by belts and driven stepwise from a gear train 18 controlled from the bag feeding through the machine 12 that forms said bags, a system 19 for taking up the play of the band 17 being provided so as to adapt the length thereof to the height of the bags formed in said machine 12. The band 17 conveys one bag by each motion thereof as shown in FIGS. 2, 3 and 6, up to the sealing jaws 7 in such a way that the edges of the bag opening 9 are located between said jaws, or as shown in FIGS. 4 and 5, up to adjacent the jaws 7, the bag opening being in this latter case brought between the sealing jaws 7 by the means 14 for spreading the bag walls from one another. Said means 14 are comprised in both embodiments of the device as shown in the drawings, of elements 20 arranged on either side of that plane in which the bag moves on the band 17, said elements 20 being movable so as to move at least between the end 21 of the band 17 and the sealing jaws 7, said elements 20 being so arranged as to stick temporarily to the walls 3 of the bag carried by the band and to said elements 20 is imparted an alternating motion along opposite directions, the resultant thereof being at right angle to said plane.

In the embodiment of the device as shown in FIGS. 4 and 5, the elements 20 which are comprised of sucking discs 22 connected to a vacuum pump (not shown) are driven with a combined alternating motion which is the resultant of two simultaneous translations, one translation being performed in parallel relationship with that plane in which the bag moves and the other translation occurring at right angle to said plane. Such combined movement allows to grip a bag at the end 21 of the band 17, adjacent the opening 9 of said bag, and to bring said opening while spreading the bag walls 3 from one another, between the sealing jaws 7 where the handles 1 will be introduced inside the bag before the closing of the jaws on said bag.

In the embodiment of the device shown in FIGS. 2 and 3 and 6 to 9, each one of said elements 20 is comprised of a sector 23, each one of both sector series 24 and 25 arranged on either side of the bag being mounted on a shaft 26 or 26' the axis of which lies in parallel relationship with that plane in which the bag moves on the band 17 and at right angle to the movement direction of said bag, the sectors being arranged on the shafts 26 and 26' in such a way that the bag is pinched between one sector on the shaft 26 and one sector on the shaft 26' facing one another, said sectors each having at least one sucking device 27 which is connected to at least one vacuum pump (not shown), said sucking device 27 being located on the sector part nearest the sealing jaws 7. The shafts 26 and 26' are controlled simultaneously and driven about the axis thereof and along opposite directions, through two toothed segments 28 and 29 which are made fast, respectively, to each shaft and meshing together the segment 28 being driven with a motion along arrow 83, by the band 17 the shaft 84 of which drives through an electro-magnetic clutch 80, a pinion 85 that meshes with said segment 28, the segment 29 being driven with a motion as shown by arrow 86, by a rocking pneumatic ram 30 that swings about a fixed shaft 31. The means 15 for introducing the parts 10 of the handles 1 inside the bag comprise in the embodiment shown in FIGS. 2 to 3 and 6 to 9, a slide 33 guided in slideways 34, through rollers 35 so as to reciprocate between two end positions, the one position in which the slide is located underneath a magazine 36 inside which the handles 1 are stocked and go down by gravity in pairs in the slide, the handles comprising a pair being either joined removably together or being free relative to one another, and a position in which said slide 33 is located adjacent the jaws 7 for introducing the handle parts 10 between the bag walls. The magazine 36 is provided with a system (not shown) which prevents the handles falling down when the slide does not lie underneath the magazine, said slide being so arranged that the parts 10 of the handles 1 it bears, project relative to the slide on that side thereof which is directed towards the sealing jaws 7, the handles being supported by the slide by the sealing operations.

In the embodiment of the device shown in FIGS. 4 and 5, the means 15 comprise two slides 33 that move in parallel relationship and cooperate with two magazines 36 similar to the one described above. Each one of said latter slides transfers a handle 1 from the corresponding magazine 36 to the sealing jaws 7 and supports its handle by the sealing operations. The movements of the slide or slides 33 are controlled by one or two pneumatic rams 37 and they are synchronized with the movements of the band 17, said means spreading the bag walls 3 from one another and the sealing jaws 7 so that the handle parts 10 are introduced inside the bag when the walls thereof and the sealing jaws 7 are moved away from one another, said jaws moving in opposite directions and alternately, along a direction at right angle to the plane in which the bags move on the band 17, under the action of two pneumatic rams 38. The means 16 for removing the bag provided with the handles from the sealing jaws 7 comprise as shown notably in FIG. 9, a double finger 39 to which is imparted an intermittent alternating motion, said double finger being so designed as to be received in the one end position thereof lying adjacent the sealing jaws 7, in the handles 1 of that bag to which the handles are sealed, the other end position of the double finger being located at a distance of the jaws 7 which is larger than the bag height, a double fixed rod 40 supported by a shaft 41 with an adjustable position according to the bag height is advantageously provided on the path of the double finger 39 to release the bag handles therefrom. The means 16 comprise also an endless conveying belt 42 on which the bags provided with the handles come to lie so as to be discharged from the device. Said conveying belt 42 has an intermittent movement which is synchronized with the intermittent alternating motion of the double finger 39, the movement of the belt 42 having the same direction as the movement of the double finger 39 when said finger moves from the end position thereof adjacent the jaws 7 towards the other end position thereof while the belt 42 remains stationary when the double finger 39 performs its reverse movement. The magnitude of the movement of said conveying belt 42 is smaller than the magnitude of the movement of the double finger 39 in such a way that the bags removed from the sealing jaws 7 overlap on said conveying belt 42. The double finger 39 to which is imparted a straight alternating motion, is attached to a rod which extends at right angle to the bag movement direction in the device and in parallel relationship with said shaft 41. The rod 43 is guided at both ends and through rollers 44, in two parallel rails 45. Said rod 43 is attached to two endless toothed belts 46 which are mounted on return pulleys 47 with axis in parallel relationship with the axis of the rod 43, the one pulley 47 supporting each one of the belts 46 being imparted an intermittent alternating motion from a pneumatic ram 48. The control of both pulleys driven from said ram 48 occurs through a toothed segment 49 mounted on a shaft 50 with an axis in parallel relationship with the axis of the pulleys 47 to which is imparted an intermittent alternating motion about said shaft 50, said segment 49 meshing with a gear wheel 51 made fast to a shaft 52, said shaft 52 bearing two pinions 53 meshing in turn with one gear wheel 54 made fast to the shaft of both driven pulleys 47. The toothed segment 49 also controls the conveying belt 42 through a chain 55 the one end 56 of which is attached to the segment while the end 57 thereof is attached to the end 58 of a spring 59 the other end 60 of which is attached to a fixed rod 61. Said chain 55 forms a loop about a gear wheel 62 mounted on one of the shafts 63 that support the conveying belt 42 and so arranged as on the one hand to rotate said shaft 63 when the segment 49 drives the double finger 39 to release the bag from the sealing jaws 7 and on the other hand to rotate freely relative to the shaft 63 when the segment 49 returns said finger adjacent to said jaws 7. the chain 55 being always maintained tight by the spring 59. All of the members of said device are advantageously mounted in a movable frame 64 supported by a structure 65 so as allow adjusting the position of the frame 64 relative to the structure and to the bag-forming machine with which the device may be associated, to adapt the device to the height of the bags formed on said machine, said adjustment being made by means of a worm 66 driven by a handwheel 67. The system 19 for taking up the play of the endless band 17 cooperates with a ram 68 which through a lever 69 rocking about a shaft 70, constantly pulls a rod 71 so as to tighten the belts comprising the band 17. The position of the structure 65 of the device and thereby the position of the frame 64 is adjustable in the height by means of screws 72.

The device shown in FIGS. 6 to 9 is controlled by cams 73 mounted on a shaft 74 which is rotated by a shaft 75 of the bag-forming machine. It is well understood that it might be controlled in the same way from the shaft of a supply conveying belt for bags from a stock of formed bags. The cams 73 control switches 76, 77, 78 and 79 which fulfill the following functions: the movement of the sectors 23 towards the sealing jaws is initiated by a switch (not shown) which is influenced by the bag carried by the band 17 and by an electro-magnetic clutch 80 which has for purpose to move the sectors 23 with precisely the same linear speed as the belts comprising the band 17. The clutch 80 operates up to the time where the switch 76 is closed, the movement of the sectors 23 towards the jaws 7 is stopped and the sectors are brought back by the rocking ram 30. The sucking devices of the sectors 23 are connected to said vacuum pump through a valve which is controlled by the switch 78 which also controls the rams operating the sealing jaws 7, the sucking devices 27 being connected to the vacuum pump as long as the jaws 7 are spaced from one another. The control of the slide for introducing the handles inside the bag is performed by means of the ram while the bag walls are spread from one another, the movements of the slide 33 being initiated by the switch 77, the cams being so arranged that the jaws 7 remain spaced from one another up to the time where the handles are in position and to the time where the bag edges engage said handles. The switch 79 allows the ram 48 to operate and to drive the means for releasing the bag from the sealing jaws when the sealing operations are completed. The switch 81 shows by the closing thereof and when a lamp controlled thereby lights up, that the device members are correctly adjusted to correspond to the height of the bags to be fitted with handles while the switch 82 energizes by the closing thereof, the sealing jaws 7.

It must be understood that the invention is in no way limited to the above embodiments and that many changes may be brought therein without departing from the scope of the invention as defined by the appended claims.

It would notably be possible for adjusting the travel of the double finger 39 and of the conveying belt 42 according to the height of the bags to be manufactured and to avoid a movement over the maximum travel by each operation, which would slow down the device output when manufacturing bags with a low height, to displace the point 90 where the ram 48 acts on the segment 49 which is provided for this purpose with holes 91.

I claim:

1. In apparatus for attaching a handle to the edge of each of two opposite walls of a bag, said apparatus including means for feeding bags one-by-one in a given direction to a sealing station which includes means for spreading the opposite walls, means for introducing handles between the spread walls and a pair of sealing jaws for sealing each wall to one of the handles the improved means for removing a bag provided with handles from the sealing station which comprises: a finger insertable in the handles of the bag; means for imparting intermittent alternating movement to said finger along a path extending in the bag feed direction from the sealing jaws to a release point spaced from the jaws a distance greater than the height of the bag; and means for releasing the bag handles from said finger at said release point.

2. Apparatus as in Claim 1 including an endless conveyor for receiving bags released from said finger at said release point.

3. Apparatus as in Claim 2 including means for imparting intermittent movement to said endless conveyor synchronized with the alternating movement of said finger, the conveyor movement occurring in the same direction as said finger when said finger moves toward said release point, the magnitude of the conveyor movement being smaller than the magnitude of the finger movement in such a way that successive bags overlap on said conveyor.

4. Apparatus as in Claim 1 in which to said finger is imparted a straight alternating motion, said finger being attached to a rod which extends at right angle to the bag movement direction in said apparatus and which is guided at both ends thereof in two parallel rails, said rod being connected to at least one endless belt mounted on return pulleys with axis in parallel relationship with the rod axis, an intermittent alternating motion being imparted to one pulley.

5. Apparatus as in Claim 1 in which at least one rod is arranged in the path of the bag handles when the same are engaged with said movable finger and outside the finger path, said rod slanting relative to said finger in such a way that when said finger comes near the bag release point said rod releases the handles from the finger.

6. Apparatus as in Claim 4 including a toothed segment mounted on a shaft with an axis in parallel relationship with the axis of said pulleys, said toothed segment being imparted an intermittent alternating motion about the shaft thereof and meshing, through an intermediate gear wheel, with a pinion made fast to the return pulley shaft, means being provided on said toothed segment for controlling said conveying belt together with the finger-bearing rod.

7. Apparatus as in Claim 6 in which said means provided on the toothed segment have an adjustable stroke so as to make possible varying of the movable finger travel and of the conveying belt travel according to the bag height.

8. Apparatus as in Claim 6 in which the means provided for controlling the conveying belt comprise a chain one end of which is attached to the toothed segment while the other end is attached to one end of a spring the other end of which is attached to a fixed point, said chain forming a loop about a gear wheel mounted on one of the shafts bearing the conveying belt and being arranged to rotate said shaft when said segment operates said finger to release the bag from the sealing jaws and to rotate freely relative to said shaft when said toothed segment returns said finger to adjacent the sealing jaws the chain being always maintained tight by said spring.

9. Apparatus as in Claim 2 in which all of the elements are mounted in a frame supported by a structure and movable relative thereto at least along a horizontal direction, means being provided for cooperating with said frame and structure so as to adjust the frame position relative to said structure and to a bag-forming machine for adapting the apparatus to the height of the bags formed by said machine.

References Cited

UNITED STATES PATENTS

| | | | |
|---|---|---|---|
| 3,698,289 | 10/1972 | Kamins et al. | 93—8 WA |
| 3,156,206 | 11/1964 | Hall et al. | 229—54 C |
| 3,440,124 | 4/1969 | Schwarzkopf | 156—423 |
| 3,486,421 | 12/1969 | Franson | 93—35 H |
| 3,503,179 | 3/1970 | Pierre | 53—386 |
| 3,701,232 | 10/1972 | Parker | 53—386 |

FOREIGN PATENTS

| | | |
|---|---|---|
| 753,374 | 9/1970 | Belgium. |
| 1,589,948 | 4/1970 | France. |

DANIEL J. FRITSCH, Primary Examiner

U.S. Cl. X.R.

93—8 WA, 35 H; 156—293, 539, 560, 562, 572